US012638899B2

(12) United States Patent
Ju et al.

(10) Patent No.: US 12,638,899 B2
(45) Date of Patent: May 26, 2026

(54) FAST POWER CONTROL MECHANISM FOR MULTI USERS

(71) Applicant: MEDIATEK INC., Hsinchu (TW)

(72) Inventors: Fu-Shing Ju, Hsinchu (TW);
Chien-Chih Tseng, Hsinchu (TW);
Ju-Hung Teng, Hsinchu (TW);
Show-Hong Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 127 days.

(21) Appl. No.: 18/786,986

(22) Filed: Jul. 29, 2024

(65) Prior Publication Data

US 2025/0044857 A1 Feb. 6, 2025

Related U.S. Application Data

(60) Provisional application No. 63/516,560, filed on Jul. 31, 2023.

(51) Int. Cl.
*G06F 1/3225* (2019.01)
*G06F 1/26* (2006.01)
*G06F 1/3203* (2019.01)
*G06F 1/3234* (2019.01)
*G06F 1/3287* (2019.01)
*G06F 9/50* (2006.01)

(52) U.S. Cl.
CPC .......... *G06F 1/3225* (2013.01); *G06F 1/3275* (2013.01)

(58) Field of Classification Search
CPC .... G06F 1/3225; G06F 1/3275; G06F 1/3203; G06F 1/3287; G06F 1/26; G06F 9/5016
See application file for complete search history.

(56) References Cited

U.S. PATENT DOCUMENTS

| 2004/0123007 A1* | 6/2004 | Stevens, Jr. | .......... G06F 13/378 710/260 |
| 2008/0109665 A1 | 5/2008 | Kuhlmann et al. | |
| 2008/0288693 A1* | 11/2008 | Todoroki | .............. G06F 9/4812 710/262 |
| 2009/0228638 A1* | 9/2009 | Kwon | ...................... G11C 8/16 711/149 |

(Continued)

FOREIGN PATENT DOCUMENTS

| TW | 201104403 A | 2/2011 |
| WO | 02088894 A2 | 11/2002 |

OTHER PUBLICATIONS

Taiwan Patent Office, "Office Action", Feb. 26, 2025, Taiwan.
European Patent Office, Search Report, Jun. 12, 2024, Germany.

*Primary Examiner* — Jaweed A Abbaszadeh
*Assistant Examiner* — Gayathri Sampath
(74) *Attorney, Agent, or Firm* — Troutman Pepper Locke LLP; Tim Tingkang Xia, Esq.

(57) ABSTRACT

A chipset holds a first hardware semaphore to indicate that a processing subsystem is powered off. This first hardware semaphore coordinates power states between a driver and the processing subsystem. The chipset releases the first hardware semaphore when the processing subsystem is powered on. This release allows the driver to operate on a hardware component associated with the processing subsystem. The chipset attempts to acquire the first hardware semaphore by the processing subsystem before powering off. The chipset powers off the processing subsystem upon successfully acquiring the first hardware semaphore.

20 Claims, 4 Drawing Sheets

(56) References Cited

U.S. PATENT DOCUMENTS

| 2010/0293401 A1 | 11/2010 | de Cesare et al. |
| 2012/0166831 A1 | 6/2012 | Shimoda |
| 2014/0281283 A1 | 9/2014 | Shacham et al. |
| 2017/0003707 A1 | 1/2017 | Henry et al. |
| 2024/0095205 A1* | 3/2024 | Marcovitch ......... G06F 13/4022 |

* cited by examiner

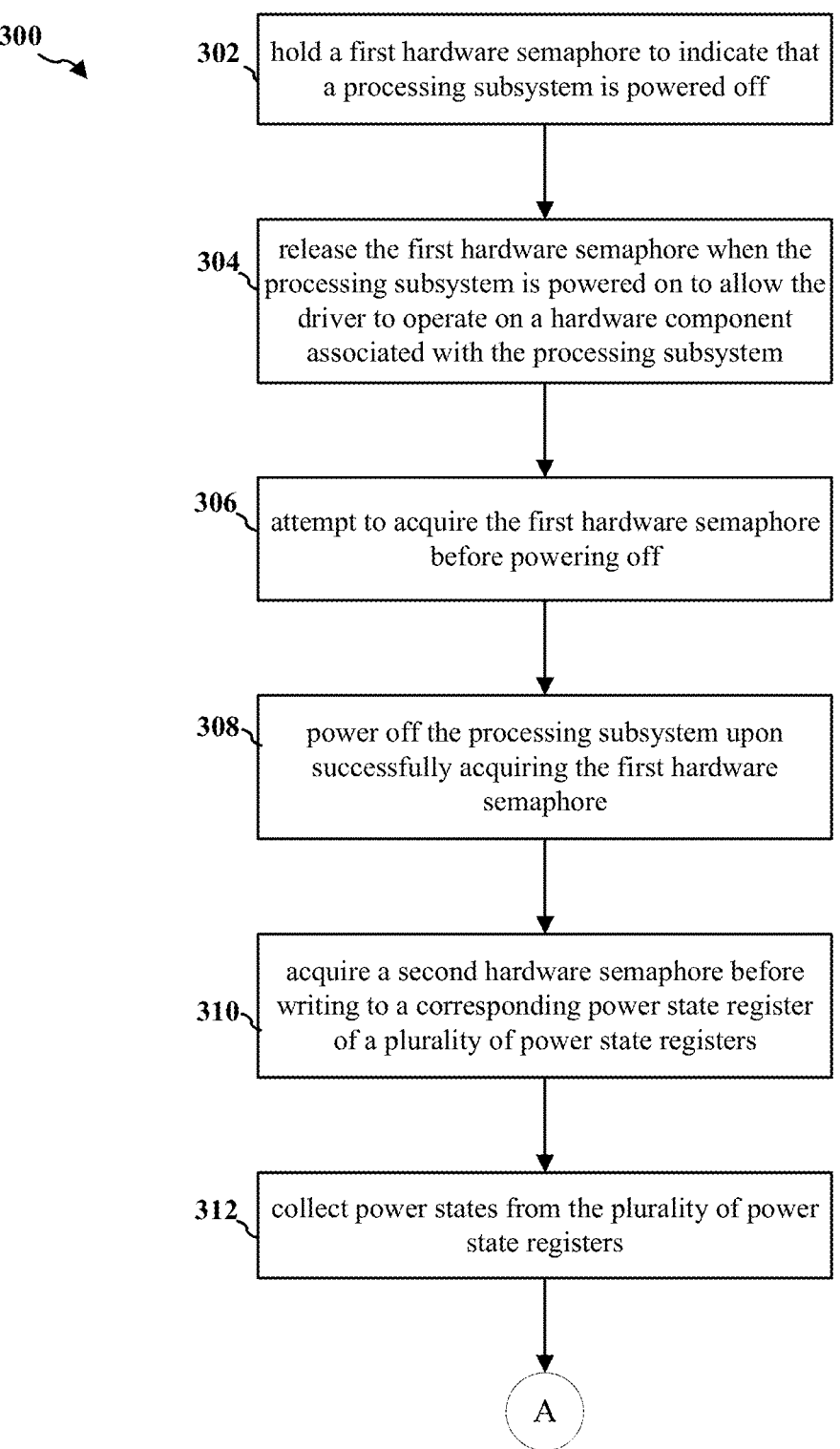

300

302 hold a first hardware semaphore to indicate that a processing subsystem is powered off 304 release the first hardware semaphore when the processing subsystem is powered on to allow the driver to operate on a hardware component associated with the processing subsystem 306 attempt to acquire the first hardware semaphore before powering off 308 power off the processing subsystem upon successfully acquiring the first hardware semaphore 310 acquire a second hardware semaphore before writing to a corresponding power state register of a plurality of power state registers 312 collect power states from the plurality of power state registers

FAST POWER CONTROL MECHANISM FOR MULTI USERS

CROSS-REFERENCE TO RELATED APPLICATION(S)

This application claims the benefits of U.S. Provisional Application Ser. No. 63/516,560, entitled "APUSYS FAST POWER ON/OFF FOR MULTI HOST" and filed on Jul. 31, 2023, which is expressly incorporated by reference herein in its entirety.

BACKGROUND

Field

The present disclosure relates generally to power management in multi-host computing environments, and more particularly, to techniques of efficiently managing power on/off states using hardware semaphores and hardware voters to reduce latency and software complexity.

Background

In the field of mobile devices, such as smartphones, power management is a critical aspect of system design. As these devices rely on battery power, there is a constant need to optimize power consumption while maintaining performance. One of the key components in modern mobile SoCs (System on a Chip) is an artificial intelligence (AI) accelerator, which is used to perform AI computations for various applications, such as camera image processing, voice recognition, and more.

The power management of the AI accelerator (APUSYS) in a mobile SoC involved complex software-based communication between multiple drivers within the Linux environment. The power on/off process for the APUSYS required extensive handshaking between the RV/Power driver and the MMU (Memory Management Unit) driver through the Linux_pm_runtime framework. This approach may lead to significant latency in the power on/off process and was susceptible to large fluctuations due to the non-realtime nature of the Linux OS.

Furthermore, there are challenges in managing power states for multiple hosts accessing the APUSYS, such as Linux, TEE (Trusted Execution Environment), SCP (SensorHub Control Processor), Modem, and Audio. Each host requires its own power management driver, leading to increased memory usage and development effort. The communication between these hosts and the APUSYS driver added additional latency to the power on/off process.

The complex mapping between the power path and data path controllers for the MMU and APUSYS hardware further complicated the power management process. The APUSYS driver controlled the power for the MMU hardware, while the MMU driver controlled the data path for the APUSYS. This interdependency required extensive communication between the drivers, increasing the overall complexity of the system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a chipset. The chipset holds a first hardware semaphore to indicate that a processing subsystem is powered off. This first hardware semaphore coordinates power states between a driver and the processing subsystem. The chipset releases the first hardware semaphore when the processing subsystem is powered on. This release allows the driver to operate on a hardware component associated with the processing subsystem. The chipset attempts to acquire the first hardware semaphore by the processing subsystem before powering off. The chipset powers off the processing subsystem upon successfully acquiring the first hardware semaphore.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 3(A) and 3(B) are a flow chart of a method for power operation of a chipset.

DETAILED DESCRIPTION

Figure 1:
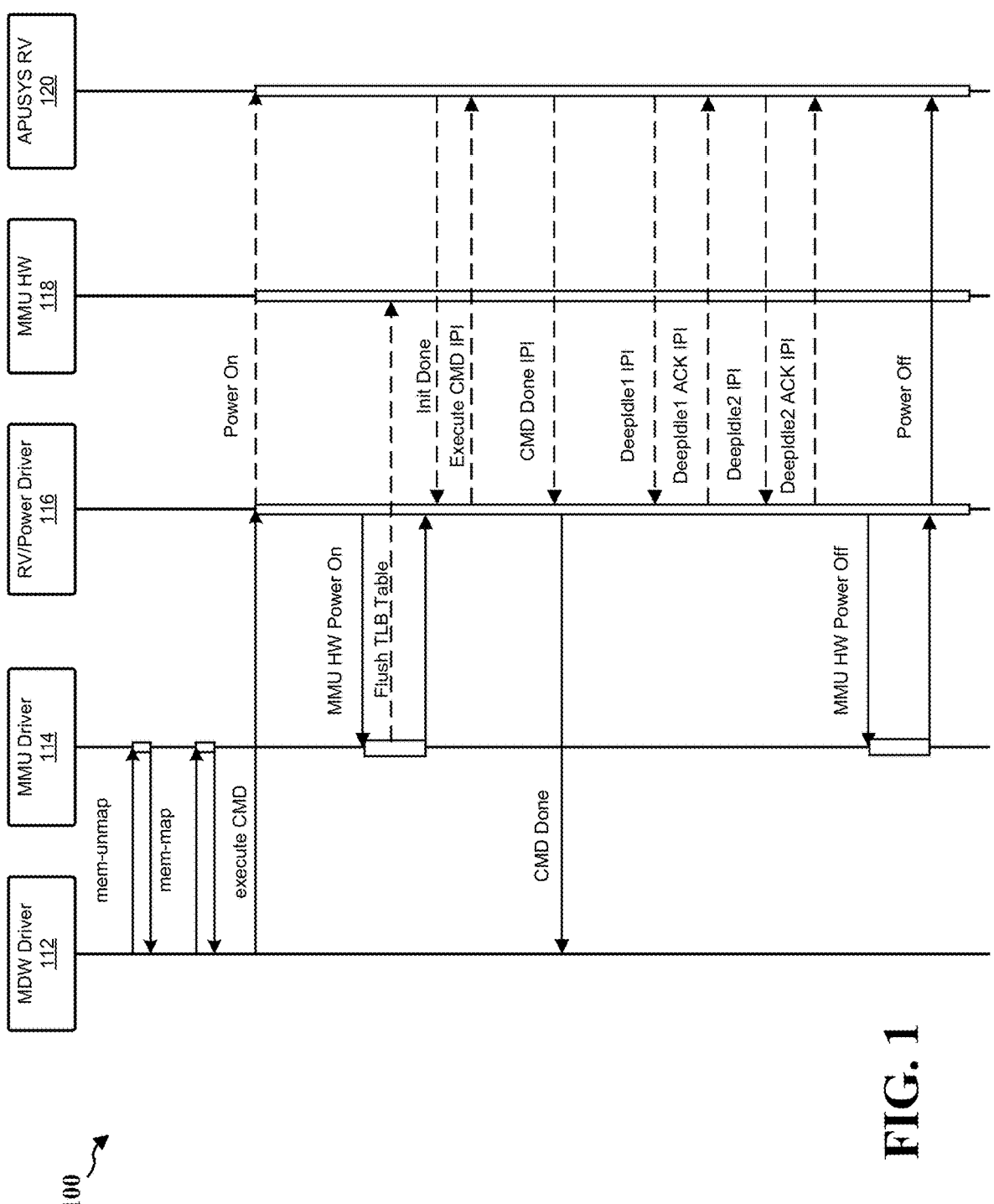
FIG. 1 is a diagram illustrating certain hardware components of a chipset of a user equipment (or a computing device) and certain software components running on the chipset according to a first scheme.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram 100 illustrating certain hardware components of a chipset of a user equipment (or a computing device) and certain software components running on the chipset according to a first scheme. In this example, the UE include, among other components, the following: a MDW (Middleware) driver 112 that receives AI computation requests from the user and forwards them to the APUSYS hardware, a MMU driver 114 responsible for managing the MMU hardware 118 and flushing the TLB (Translation Lookaside Buffer) table; a RV/Power driver 116, which controls the power state of the APUSYS RV 120 (AI accelerator); MMU HW 118 that is a hardware component that performs virtual-to-physical address translation for the APUSYS RV 120 to access the DRAM; and an APUSYS RV 120 which is the AI accelerator that executes the AI computations.

In the first scheme, to power on the UE, the MDW driver 112 sends a 'mem-unmap' command to the MMU driver 114, which handles the memory unmapping process. Once this is completed, the MDW driver 112 sends a 'mem-map' command to the MMU driver 114 to map the memory again. Next, the MDW driver 112 issues an 'execute CMD' command to the RV/Power driver 116, which initiates the power-on sequence for the APUSYS RV 120. Then, the RV/Power driver 116 notifies the MMU driver 114 to power on the MMU HW 118 using the Linux pm_runtime framework. The MMU driver 114 flushes the TLB table in the MMU HW 118. The MMU driver 114 confirms the completion of the TLB flush to the RV/Power driver 116 via the pm_runtime framework. The RV/Power driver 116 allows the APUSYS RV 120 to boot up. The APUSYS RV 120 sends an "Init Done" signal to the RV/Power driver 116 upon completing the boot process. The RV/Power driver 116 sends an "Execute CMD IPI" to the APUSYS RV 120 to start executing the AI computation. The APUSYS RV 120 executes the command and sends a 'CMD Done IPI' signal back to the RV/Power driver 116, which in turn notifies the MDW driver 112 that the command execution is complete.

In the first scheme, to power off the UE, the APUSYS RV 120 exchanges two IPIs (Inter-Processor Interrupts) with the RV/Power driver 116 to confirm that it can be powered off (DeepIdle1 and DeepIdle2 IPIs). The APUSYS RV 120 starts the power off process and notifies the RV/Power driver 116 once it no longer requires access to the DRAM. The RV/Power driver 116 notifies the MMU driver 114 to stop accessing the MMU HW 118 using the pm_runtime framework. The RV/Power driver 116 confirms that the MMU driver 114 has acknowledged this request via the pm_runtime framework. The RV/Power driver 116 powers off the APUSYS RV 120.

In the first scheme, the power on/off process for the APUSYS RV 120 involves complex handshaking and communication between the RV/Power driver 116 and the MMU driver 114 through the Linux pm_runtime framework. This may introduce significant latency in the power on/off process.

The non-realtime nature of the Linux OS may also lead to large fluctuations in the power on/off latency. Furthermore, the need for multiple iterations of communication between the APUSYS RV 120 and the RV/Power driver 116 during the power off sequence may further increase the latency.

Table 1 illustrates the mapping between the power path controller and data path controller for the MMU HW 118 and APUSYS HW (APUSYS RV 120). This mapping leads to a complex control scenario between the MMU HW 118 and APUSYS RV 120, requiring extensive bidirectional communication between the MMU driver 114 and APUSYS Linux Driver (RV/Power driver 116) in the Linux environment.

Power Path and Data Path Controllers for MMU HW and APUSYS HW

|  | Power path controller | Data path controller |
|---|---|---|
| MMU HW | APUSYS Linux Driver | MMU Linux Driver |
| APUSYS HW | APUSYS Linux Driver | MMU Linux Driver |

The power path controller for the MMU HW 118 is the APUSYS Linux Driver (RV/Power driver 116), while the data path controller is the MMU Linux Driver (MMU driver 114). This means that the APUSYS Linux Driver controls the power for the MMU hardware, even though it is not directly responsible for its data path.

On the other hand, the APUSYS HW (APUSYS RV 120) relies on the MMU Linux Driver (MMU driver 114) to control its data path, as it cannot control the data translation on its own.

This complex mapping between the power path and data path controllers necessitates extensive communication between the MMU driver 114 and APUSYS Linux Driver (RV/Power driver 116) in the Linux environment, leading to increased latency and complexity in the power on/off process.

In the first scheme, multiple hosts such as Linux, TEE (non-Linux software (SW)), SCP (low power hardware (HW)), Modem (HW), and Audio (HW) may use the APU- SYS RV 120 for AI computations. Some hosts, like SCP, may use the APUSYS RV 120 in suspend mode without requiring access to DRAM, while others, such as Modem and Audio, may need to access DRAM despite not being part of the Linux environment.

This multi-host scenario introduces additional latency and complexity in the power on/off process. Non-Linux hosts face challenges when attempting to power on the APUSYS RV 120, as they must either request Linux to perform the power on operation, resulting in increased latency, or implement their own power driver within each host, leading to increased development effort and memory usage.

Furthermore, non-Linux hosts that require DRAM access must communicate with the Linux and MMU driver 114, introducing additional latency. The power on/off process for the APUSYS RV 120 becomes increasingly complex as the number of hosts increases, as the RV/Power driver 116 must communicate with each host to confirm their usage status before proceeding with the power off sequence. This results in a rapid increase in latency as the number of hosts grows.

A second scheme aims to address these challenges of the first scheme. The second scheme eliminates the need for communication between Linux drivers by using hardware signals to coordinate the MMU driver 114's actions at the appropriate times. The second scheme simplifies the power on/off flow and manage the power states of multiple hosts to avoid state errors. This can be achieved by introducing a new hardware component that manages power on/off operations for multiple hosts simultaneously. The second scheme streamlines the power on/off software process, reducing it to a single register write operation.

By implementing these enhancements, the complexity and latency associated with power management in a multi-host environment can be significantly reduced, leading to faster power on/off times and improved overall system efficiency.

More specifically, the second scheme eliminates the need for this software handshaking by using hardware signals to coordinate the MMU driver 114's actions at the appropriate times. This is achieved by implementing a hardware semaphore mechanism such that the MMU driver 114 only operates when the APUSYS RV 120 is powered on. The hardware semaphore acts as a mutex lock, which is held by the APUSYS RV 120 when it is powered off and released when it is powered on. This allows the MMU driver 114 to determine the power state of the APUSYS RV 120 without requiring software communication.

The second scheme also simplifies the power on/off flow by introducing a hardware voter that manages the power states of multiple hosts. Each host, such as Linux, TEE, SCP, Modem, and Audio, has its own mailbox (MBOX) hardware, which includes a power on/off register. Before a host can operate its power on/off register, it must acquire the hardware semaphore. This prevents simultaneous state changes by multiple hosts, avoiding state errors.

As described infra, the hardware voter collects the power on/off states from all the MBOX power on/off registers and determines the overall power state of the APUSYS RV 120. It decides whether to power on or off the APUSYS RV 120 and whether to switch between normal and low power modes. This hardware-based approach reduces the complexity of the power on/off process and minimizes the need for software communication.

The second scheme may offers several benefits:

Stable and Fast Power On/Off Time: By eliminating software handshaking and using hardware signals, the power on/off times are more stable and significantly faster. The power on time is reduced from 2,160 μs to 880 μs, and the power off time is reduced from 1,800 μs to 530 μs.

Less Software Module Dependency: The dependency on multiple software modules is reduced, leading to fewer issues and easier maintenance.

Reduced Software Development Effort: The need for extensive software communication is minimized, reducing the development effort required for implementing and maintaining the power management system.

Figure 2:
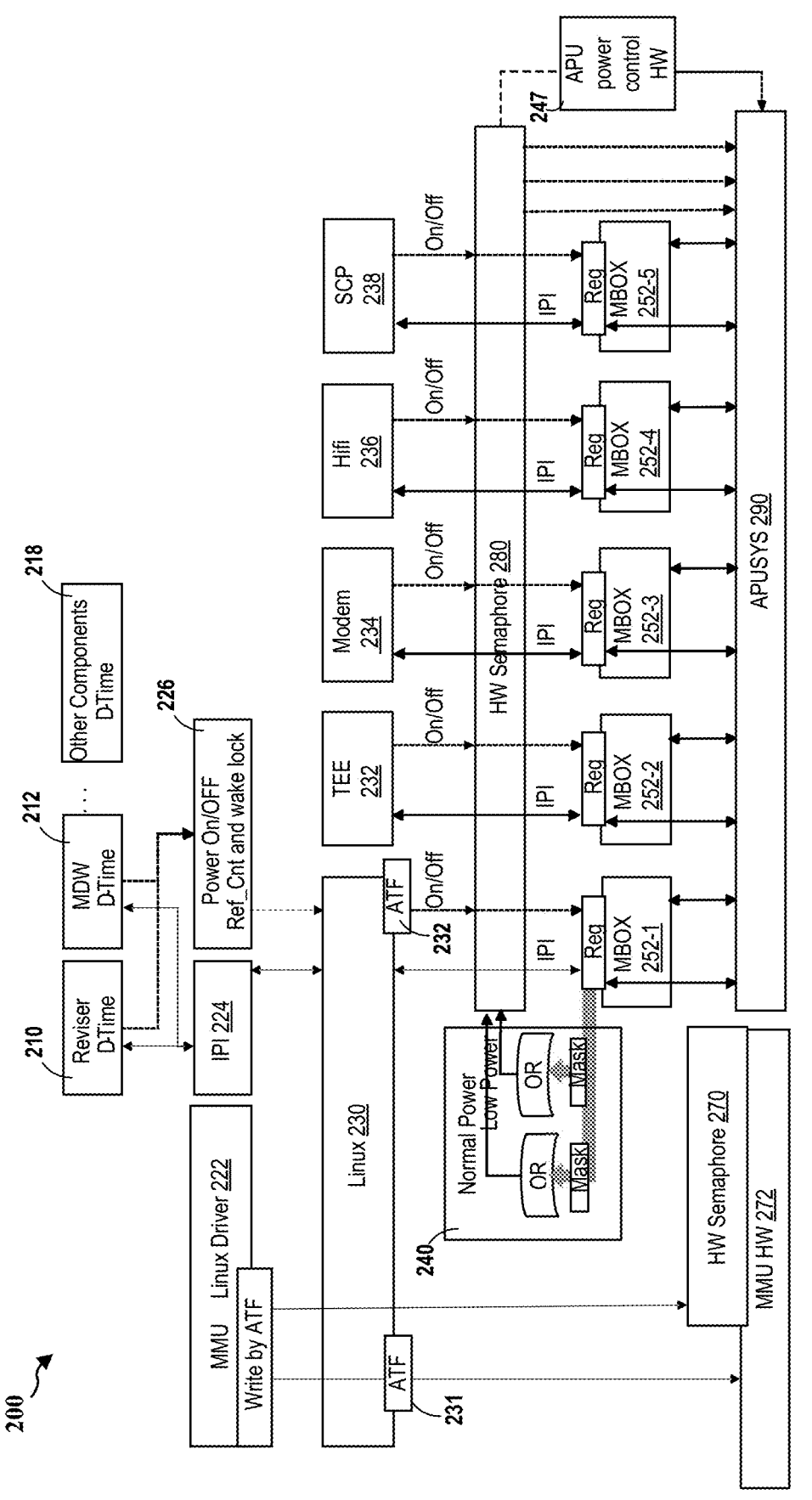
FIG. 2 is a diagram illustrating certain hardware components of a chipset of a user equipment (or a computing device) and certain software components running on the chipset according to the second scheme.

FIG. 2 is a diagram 200 illustrating certain hardware components of a chipset of a user equipment (or a computing device) and certain software components running on the chipset according to the second scheme. The UE includes, among other components, a hardware semaphore (HW Semaphore 270) for coordinating power states between the MMU Linux Driver 222 and the APUSYS 290; a hardware voter (control circuit 240) and mailbox (MBOX 252-1 to 252-5) mechanism for managing power states of multiple hosts (Linux 230, TEE 232, Modem 234, Hifi 236, and SCP 238); and an APU power control HW 247 for handling power state transitions and interrupts.

The HW Semaphore 270 is used to coordinate power states between a MMU Linux Driver 222 and a APUSYS 290. By default, the HW Semaphore 270 is held, indicating that the APUSYS 290 is powered off. When the APUSYS 290 is powered on, the HW Semaphore 270 is released, allowing the MMU Linux Driver 222 to operate on the MMU HW 272. Before powering off, the APUSYS 290 must continuously attempt to acquire the HW Semaphore 270 until it succeeds, ensuring that the MMU Linux Driver 222 is not accessing the MMU HW 272 during the power-off sequence.

The hardware voter (control circuit 240) and mailbox mechanism are used to manage the power states of multiple hosts. Each host (Linux 230, TEE 232, Modem 234, Hifi 236, and SCP 238) has its own MBOX (252-1 to 252-5), which includes a power on/off register. To change the power state, a host must first acquire a HW Semaphore 280, preventing simultaneous state changes by multiple hosts. Once the HW Semaphore 280 is acquired, the host can write to its power on/off register to request a power on or power off.

The control circuit 240 collects the power on/off states from all MBOX power on/off registers and determines the overall power state of the APUSYS 290. It decides whether to power on or off the APUSYS 290 and whether to switch between normal and low power modes. The APU power control HW 247 handles the actual power state transitions and generate interrupts to notify the hosts of the current power state.

This hardware-based approach simplifies the power on/off process and reduces the need for complex software communication between the hosts and the APUSYS 290. By using the HW Semaphore 280 and the hardware voter mechanism, the proposed solution achieves faster and more stable power on/off times while minimizing software complexity and development effort.

In the proposed solution, the Reviser 210 and MDW 212 components handle the D-Time (Dynamic Time) for the IPI 224 and power control signals 226, which are used to control the power states and communicate with the Linux 230 host. Other components 218 in the system may also interact with the power management mechanism as needed.

By eliminating or reducing the need for complex software handshaking and introducing hardware-based mechanisms for power state coordination and management, the second scheme addresses the latency and complexity issues associated with multi-host power on/off scenarios, resulting in improved system performance and reduced development effort.

As described supra, the HW Semaphore 270 coordinates the power states between the MMU Linux Driver 222 and the APUSYS 290. This hardware semaphore acts as a mutex lock. The MMU Linux Driver 222 and the APUSYS 290 operate in a mutually exclusive manner, preventing unintended actions during power state transitions.

By default, when the UE is powered on, the HW Semaphore 270 is held, indicating that the APUSYS 290 is powered off. In this state, no entity can acquire the semaphore. When the APUSYS 290 is powered on, it releases the HW Semaphore 270, allowing the MMU Linux Driver 222 to acquire it and perform necessary operations on the MMU HW 272.

When the MMU Linux Driver 222 needs to update the mapping between physical and virtual addresses in the MMU HW 272, it first attempts to acquire the HW Semaphore 270. If the semaphore cannot be acquired, it indicates that the APUSYS 290 is powered off, and the update is not required. However, if the semaphore is successfully acquired, it confirms that the APUSYS 290 is powered on, and the MMU Linux Driver 222 can proceed with updating the mapping and translation table in the MMU HW 272.

During the power-off process, the APUSYS 290 continuously attempts to acquire the HW Semaphore 270. If the semaphore is successfully acquired, it indicates that the MMU Linux Driver 222 is not operating on the MMU HW 272, and the APUSYS 290 can safely power off. Once the APUSYS 290 powers off, the MMU Linux Driver 222 will not be able to acquire the semaphore, preventing any unintended operations on the MMU HW 272.

This hardware semaphore mechanism simplifies the complex communication between the MMU Linux Driver 222 and the APUSYS 290 in the Linux environment. The MMU Linux Driver 222 can determine the power state of the APUSYS 290 by simply attempting to acquire the HW Semaphore 270, eliminating the need for complex software handshaking. Similarly, the APUSYS 290 can control the access to the MMU HW 272 by the MMU Linux Driver 222 through the HW Semaphore 270. Both entities operate at the correct times and avoid any unintended actions.

The HW Semaphore 270 is implemented as a hardware component within the System-on-Chip (SoC) of the UE. It is part of the main CPU and is accessible to both the MMU Linux Driver 222 and the APUSYS 290.

The second scheme uses a hardware-based mechanism for managing the power on/off states of multiple hosts accessing the APUSYS 290. This mechanism includes a hardware voter (control circuit 240) and a mailbox (MBOX) mechanism having a MBOX (MBOX 252-1 to 252-5) for each host (Linux 230, TEE 232, Modem 234, Hifi 236, and SCP 238).

Each host is assigned its own MBOX hardware, which includes a power on/off register. The power on/off register contains two bits: one for normal power mode and one for suspend mode. To change the power state of the APUSYS 290, a host must first acquire the HW Semaphore 280. Only one host can access the power on/off register at a time, preventing conflicts and inconsistencies in the power state.

Once a host acquires the HW Semaphore 280, it can write to its power on/off register to request a power on or power off operation. The control circuit 240 (hardware voter)

collects the power on/off states from all the MBOX power on/off registers and determines the overall power state of the APUSYS 290.

The control circuit 240 decides whether to power on or off the APUSYS 290 based on the collective power on/off requests from all hosts. It also determines whether the APUSYS 290 should operate in normal power mode or suspend power mode. If there is a change in the power mode (e.g., from normal power to suspend power or vice versa), the control circuit 240 initiates the necessary power mode switching sequence.

The APU power control HW 247 assists in the power state transitions and generate interrupts to notify the hosts about the current power state of the APUSYS 290.

For example, when the Modem 234 host wants to power on or off the APUSYS 290, it must first acquire the HW Semaphore 280. Once the Modem 234 host has acquired the HW Semaphore 280, other hosts cannot acquire it. At this point, the Modem 234 host can write to its power on/off register (Reg 250-3) to indicate its intention to power on or off the APUSYS 290.

The control circuit 240 (hardware voter) collects the power on/off states from all the MBOX power on/off registers and determines the overall power state of the APUSYS 290. It decides whether to power on or off the APUSYS 290 based on the collective power on/off requests from all hosts. The control circuit 240 also determines whether the APUSYS 290 should operate in normal power mode or suspend power mode, initiating the necessary power mode switching sequence if required.

The hardware semaphore 280 provides that power state transitions are performed atomically, preventing race conditions and inconsistencies. The control circuit 240 simplifies the decision-making process for power on/off states and power mode transitions, reducing the latency and overhead associated with software-based coordination.

Some hosts, such as the SCP 238, operate in low power mode and do not require access to the DRAM. Other hosts, including Linux 230, TEE 232, Modem 234, and Hifi 236, operate in normal power mode and require DRAM access.

The control circuit 240 (hardware voter) differentiates between normal power and low power mode requests from the hosts. When a host requests a power on or power off operation, the control circuit 240 determines the appropriate power mode based on the collective power mode request from all the MBOX power on/off registers.

In the event of a power mode transition, such as from low power to normal power (Low→Nor PWR) or from normal power to low power (Nor→Low PWR), the APU power control HW 247 generates the necessary control signals to manage the DRAM access through the HW Semaphore 270 and MMU HW 272.

For example, when transitioning from low power to normal power mode, the APUSYS 290 must relinquish control of the HW Semaphore 270 and MMU HW 272 to enable DRAM access for the hosts operating in normal power mode. Similarly, when transitioning from normal power to low power mode, the APUSYS 290 must gain control of the HW Semaphore 270 and MMU HW 272 to prevent DRAM access, as the hosts in low power mode do not require it.

As such, the APUSYS 290 operates in the appropriate power mode and that DRAM access is granted only to the hosts that require it. This approach minimizes power consumption while maintaining the necessary functionality for each host, depending on its power mode requirements.

Figure 3B:
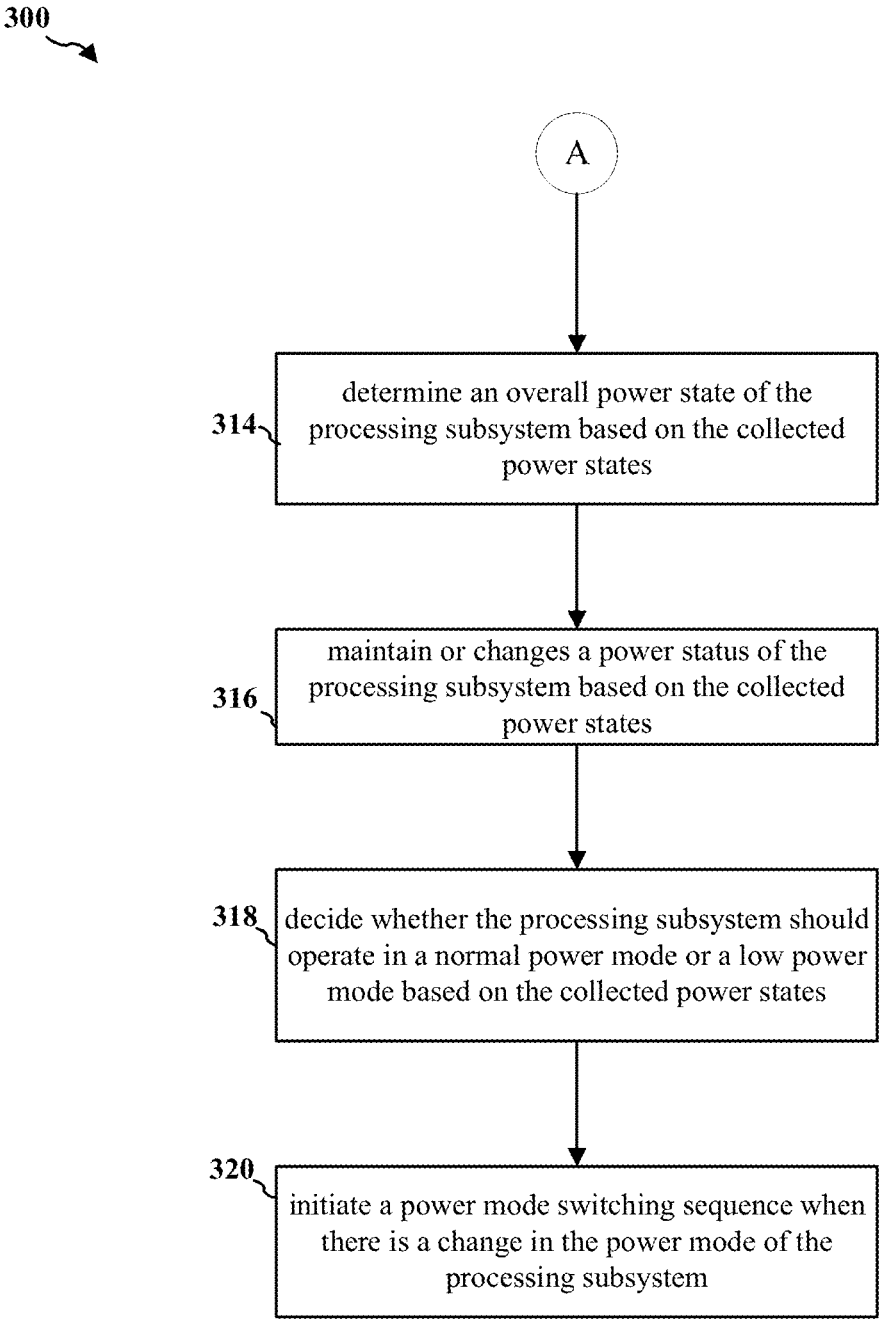

FIGS. 3(A) and 3(B) are a flow chart 300 of a method for power operation of a chipset. The method may be performed by a chipset (e.g., the chipset described in FIG. 2). In operation 302, the chipset holds a first hardware semaphore to indicate that a processing subsystem is powered off. The first hardware semaphore coordinates power states between a driver and the processing subsystem. In operation 304, the chipset releases the first hardware semaphore when the processing subsystem is powered on to allow the driver to operate on a hardware component associated with the processing subsystem. In operation 306, the processing subsystem attempts to acquire the first hardware semaphore before powering off. In operation 308, the chipset powers off the processing subsystem upon successfully acquiring the first hardware semaphore.

In certain configurations, the driver is a memory management unit (MMU) driver, and the hardware component is a memory management unit (MMU). In certain configurations, the processing subsystem is an artificial intelligence (AI) processing subsystem.

In operation 310, a host of a plurality of hosts acquires a second hardware semaphore before writing to a corresponding power state register of a plurality of power state registers. In operation 312, the chipset collects power states from the plurality of power state registers. In operation 314, the chipset determines an overall power state of the processing subsystem based on the collected power states.

In operation 316, the chipset maintains or changes a power status of the processing subsystem based on the collected power states. In operation 318, the chipset decides whether the processing subsystem should operate in a normal power mode or a low power mode based on the collected power states.

In operation 320, the chipset initiates a power mode switching sequence when there is a change in the power mode of the processing subsystem. In certain configurations, the power mode switching sequence includes transitioning from the low power mode to the normal power mode and relinquishing control of the first hardware semaphore and the hardware component to enable access to a memory for hosts operating in the normal power mode. In certain configurations, the power mode switching sequence includes transitioning from the normal power mode to the low power mode and gaining control of the first hardware semaphore and the hardware component to prevent access to a memory for hosts operating in the low power mode.

In certain configurations, the plurality of hosts includes at least one of a Linux host, a trusted execution environment (TEE) host, a modem host, an audio host, and a SensorHub Control Processor (SCP) host.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of power operation of a chipset, the method comprising:

holding a first hardware semaphore to indicate that a processing subsystem is powered off, wherein the first hardware semaphore coordinates power states between a driver and the processing subsystem;

releasing the first hardware semaphore when the processing subsystem is powered on to allow the driver to operate on a hardware component associated with the processing subsystem;

attempting to acquire the first hardware semaphore by the processing subsystem before powering off; and powering off the processing subsystem upon successfully acquiring the first hardware semaphore.

2. The method of claim 1, wherein the driver is a memory management unit (MMU) driver, and the hardware component is n memory management unit (MMU).

3. The method of claim 1, wherein the processing subsystem is an artificial intelligence (AI) processing subsystem.

4. The method of claim 1, further comprising:

acquiring a second hardware semaphore by a host of a plurality of hosts before writing to a corresponding power state register of a plurality of power state registers;

collecting power states from the plurality of power state registers; and determining an overall power state of the processing subsystem based on the collected power states.

5. The method of claim 4, further comprising:

maintaining or changing a power status of the processing subsystem based on the collected power states.

6. The method of claim 4, wherein determining the overall power state of the processing subsystem includes deciding whether the processing subsystem should operate in a normal power mode or a low power mode based on the collected power states.

7. The method of claim 6, further comprising:
initiating a power mode switching sequence when there is a change in the power mode of the processing subsystem.

8. The method of claim 7, wherein the power mode switching sequence includes:
transitioning from the low power mode to the normal power mode; and
relinquishing control of the first hardware semaphore and the hardware component to enable access to a memory for hosts operating in the normal power mode.

9. The method of claim 7, wherein the power mode switching sequence includes:
transitioning from the normal power mode to the low power mode; and
gaining control of the first hardware semaphore and the hardware component to prevent access to a memory for hosts operating in the low power mode.

10. The method of claim 4, wherein the plurality of hosts includes at least one of a Linux host, a trusted execution environment (TEE) host, a modem host, an audio host, and a SensorHub Control Processor (SCP) host.

11. A chipset comprising:
a processing subsystem;
a driver associated with a hardware component of the processing subsystem;
a first hardware semaphore that coordinates power states between the driver and the processing subsystem, wherein the first hardware semaphore is held when the processing subsystem is powered off and released when the processing subsystem is powered on to allow the driver to operate on the hardware component; and
a power management unit configured to:
attempt to acquire the first hardware semaphore before powering off the processing subsystem; and
power off the processing subsystem upon successfully acquiring the first hardware semaphore.

12. The chipset of claim 11, wherein the driver is a memory management unit (MMU) driver, and the hardware component is a memory management unit (MMU).

13. The chipset of claim 11, wherein the processing subsystem is an artificial intelligence (AI) processing subsystem.

14. The chipset of claim 11, further comprising:
a plurality of power state registers, each associated with a corresponding host of a plurality of hosts;
a second hardware semaphore; and
a hardware voter configured to:
collect power states from the plurality of power state registers; and
determine an overall power state of the processing subsystem based on the collected power states;
wherein each host of the plurality of hosts is configured to acquire the second hardware semaphore before writing to its corresponding power state register.

15. The chipset of claim 14, wherein the power management unit is further configured to:
maintain or change a power status of the processing subsystem based on the collected power states.

16. The chipset of claim 14, wherein, to determine the overall power state of the processing subsystem, the hardware voter is configured to decide whether the processing subsystem is to operate in a normal power mode or a low power mode based on the collected power states.

17. The chipset of claim 16, further comprising a power mode switching unit configured to initiate a power mode switching sequence when there is a change in the power mode of the processing subsystem.

18. The chipset of claim 17, wherein the power mode switching unit is configured to, when transitioning from the low power mode to the normal power mode:
relinquish control of the first hardware semaphore and the hardware component to enable access to a memory for hosts operating in the normal power mode.

19. The chipset of claim 17, wherein the power mode switching unit is configured to, when transitioning from the normal power mode to the low power mode:
gain control of the first hardware semaphore and the hardware component to prevent access to a memory for hosts operating in the low power mode.

20. The chipset of claim 14, wherein the plurality of hosts includes at least one of a Linux host, a trusted execution environment (TEE) host, a modem host, an audio host, and a SensorHub Control Processor (SCP) host.

* * * * *